Oct. 7, 1969   M. R. KAGAN   3,471,807
CONTINUOUSLY TUNABLE PULSED LASER SYSTEM
Filed March 11, 1968   2 Sheets-Sheet 1

INVENTOR
MORTON R. KAGAN

BY
AGENT

OUTPUT WAVELENGTH (Å) vs PATH LENGTH (INCHES)

United States Patent Office 3,471,807
Patented Oct. 7, 1969

3,471,807
CONTINUOUSLY TUNABLE PULSED LASER SYSTEM
Morton R. Kagan, Potomac, Md., assignor to International Business Machines Corporation, Armonk, N.Y., a corporation of New York
Filed Mar. 11, 1968, Ser. No. 712,204
Int. Cl. H01s 3/14
U.S. Cl. 332—7.51                        23 Claims

ABSTRACT OF THE DISCLOSURE

A laser whose output frequency is continuously tunable over a wide range, which utilizes a material having a Franck-Condon shift as the active laser medium. The frequency of the stimulated output radiation is dependent upon the optical path length of pumping radiation within said laser medium. Tuning means are provided for varying said optical path length. If the optical path length is varied according to a periodic signal, the stimulated output of the laser is frequency modulated.

BACKGROUND OF THE INVENTION

Field of the invention

This invention relates to lasers, and more particularly to organic lasers, such as dye lasers, having outputs which are continuously tunable over a wide range of frequency.

Description of the prior art

Lasers having tunable outputs are presently known, although each of these has disadvantages which make them impractical for a broad range of uses. For instance, it is known to use non-linear effects for obtaining shifts of frequency in a laser. If a non-linear crystal is placed in a laser cavity, adjacent to the lasing material, and if its index of refraction is varied by an applied voltage, the output of the laser will be varied within a limited range. However, the range over which the laser output (which is quite monochromatic) is tuned is very small. Further, extensive additional hardware is required which adds to the expense and complexity.

Raman scattering is another known effect which can be used to achieve wavelength shifts. Here the wavelength of incident light is shifted both up (Stokes lines) and down (anti-Stokes lines), but the output lines are very weak and non-collimated. By increasing the power of the input radiation, stimulated Raman emission will occur at additional wavelengths, which are separated from the exciting laser wavelength by Stokes or anti-Stokes frequencies. By choosing various Raman active materials, a large variety of different wavelengths can be obtained. Although the stimulated Stokes radiation can be quite strong, this choice of wavelengths (by changing the medium) permits a discontinuous type of laser tuning which limits the use of the device.

For continuous frequency outputs, it is necessary to fine tune the different Raman lines. However, this requires high power pumping sources and more extensive optical systems in which the sample is placed at the focal point of a near concentric laser mirror configuration having highly reflecting mirrors. The obtainable resolution using these devices is generally low, however.

Another device that has tuning capabilities is the injection laser, wherein stimulated emission occurs from the junction region of the diode. If an alloy diode is used the frequency of laser emission can be finely tuned, by such methods as changing the temperature, applying stress to the diodes, or by applying an external magnetic field. However, a set of diodes of different alloys is required to have tunability over a wide range, as each diode is tunable over only a few cm.$^{-1}$ by the above-mentioned methods.

Another known type of tunable laser is one which is based on parametric up or down conversion. In this approach, a pulse from a Q-switched laser is converted to a different frequency by harmonic generation in a non-linear crystal (such as ADP). As an extension to this device, the resulting light is then used to pump a lithium niobate crystal. However, this apparatus is quite complex and cumbersome and involves some technical difficulties. In the non-linear crystal, there is a coupling between the pump wave and two virtual waves for which the crystal cavity has resonances. For large gain, the sum of the frequencies of the virtual waves must equal the pump frequency. Furthermore, the beams must move in such direction in the non-linear crystal that phase matching can occur. This condition is temperature dependent, and tuning is achieved by varying the temperature.

A further laser, whose output is tunable, is a dye laser. Here, tuning is achieved by changing the concentration of the lasing dye material. The tuning range achieved by this scheme is quite satisfactory (several hundred A.) but the system is impractical as it is difficult to continuously change the dye concentration in both an increasing direction and a decreasing direction. Furthermore, the concentration can be changed by only certain amounts, for a given pump power, in order that stimulated emission from the dye will continue. If the concentration is increased beyond a certain amount, the pump power must also be increased, in order to sustain laser action.

Finely tuned laser outputs are presently achieved by utilizing an external electric or magnetic field to change the separation of energy levels in a gas or semiconductor laser. However, the fields required are very large and can be obtained with only very expensive solenoids, and the range of tuning is limited to the megacycle region. Also, such large fields have a deteriorating effect on the power output of the laser.

Another finely tuned laser is one whose output is diffracted, as by a traveling acoustic wave. The frequency of the diffracted light waves is increased or decreased by a multiple of the acoustical frequency. Since high frequency acoustical waves are strongly attenuated except at a low temperature, tuning beyond 0.1 cm.$^{-1}$ is difficult. In a similar scheme the laser output, which is comprised of several lines, is diffracted by a grating in order to separate the various frequencies. A prism could also be used. Another related system employs a medium in the laser cavity, separate from the lasing material, whose index of refraction can be changed, as by an applied potential. The laser output is then passed through this tuning medium and, depending on the index of the medium, the output from the cavity is changed from the laser frequency. However, the obtainable range of tuning is limited to a few thousand megacycles, since the laser output itself is quite monochromatic, and the change in index of the tuning medium is very small.

All of the above devices are restricted in their usefulness, due to such disadvantages as: a limited range of tunability; the complex and extensive nature of necessary hardware; the poor resolution of the tuned output; and the limited degree of continuous tuning possible.

Accordingly, it is a primary object of this invention to provide a laser whose output is continuously tunable over a wide range of frequencies.

Another object is to provide a laser having an output frequency that is continuously tunable over a wide range where the lasing medium is altered by changing a property thereof.

It is a further object to provide a laser having a continuously tunable output frequency which laser requires only simple hardware and is easily assembled.

Another object is to provide a laser having a continuously tunable output frequency where the desired frequency output is easily obtained with few adjustments.

Still another object is to provide a laser having a continuously tunable output frequency where any desired output frequency is easily and reliably obtained, without complex analysis.

A further object is to provide a laser having a continuously tunable output frequency wherein any desired frequency is reproducibly obtainable by simple adjustment of a calibrated tuning means by direct reference to a pre-calibrated scale.

A still further object is to provide a laser having a frequency modulated output.

The foregoing and other objects, features, and advantages of the invention will be apparent from the following more particular description of the preferred embodiments of the invention as illustrated in the accompanying drawings.

Summary of the invention

The continuously tunable laser is comprised of a source of pumping electromagnetic radiation and a cell which contains an active laser material having a Franck-Condon wavelength shift between its absorption and its emission spectrum. Gain control means may be present in the form of mirrors which enclose the cell, but this is not necessary, as there is usually sufficient gain present in the laser material.

Attached to the cell is a tuning means for tuning the frequency output of the laser material. This tuning means varies the physical length of the cell, so as to vary the optical path length of pumping radiation within the laser material. By controlling the optical path (within the laser material) of the pumping radiation, the output frequency of the laser is varied in a continuous manner.

In the preferred embodiment, the cell has a transverse extension which is fitted with a piston (driving means) whose travel is controlled by a micrometer head. A scale is provided for noting the setting of this piston. One end of the cell is slideable within and along the cell. Movement of the piston causes a change in the amount of laser material in the cell, which in turn causes the moveable end wall (driven means) to slide along the length of the cell. This varies the optical path (OP) length of pumping radiation within the laser material and hence the output frequency of the laser is changed. Although a piston driving means is shown, it is to be understood that any means by which the optical path length of the pump radiation within the laser medium is varied could be employed, without departing from the scope of the invention.

As another aspect of this invention, a laser having a frequency modulated (FM) output is provided if the piston of the preferred embodiment is replaced by a moveable diaphragm which is oscillated according to a periodically varying applied signal. In one case, the diaphragm could be of a magnetic material which is then oscillated by an applied magnetic field of a suitable frequency. For higher frequency applications, the diaphragm could be a piezoelectric or quartz element which is driven into high frequency oscillation by a microwave cavity. Here again, the various means chosen are discretionary, it being evident that a frequency modulated output will be obtained if the optical path length is changed in alternate directions according to a periodic signal.

In operation, the pump electromagnetic radiation is incident into the cell containing the laser material. This pumping radiation causes an electron population inversion in the laser material and, upon return of the electrons to a lower energy state, the laser material fluoresces, its output frequency being determined by the separation of the electron energy states within the particular material chosen as the laser medium.

To vary the output frequency, the absorption curve of the particular laser material is changed by changing the optical path length of the pump radiation within the laser medium. The emission spectrum is approximately constant since any increase in emission from the pumped region is in turn reabsorbed by the additional unpumped laser medium. Because of the Franck-Condon shift of the laser material, changes in the absorption curve will change the center frequency of the resulting gain curve for the laser material. That is, the laser output will be shifted in frequency whenever the optical path length of electro-magnetic pumping radiation within said laser medium is changed.

Description of the preferred embodiment

Figure 1:
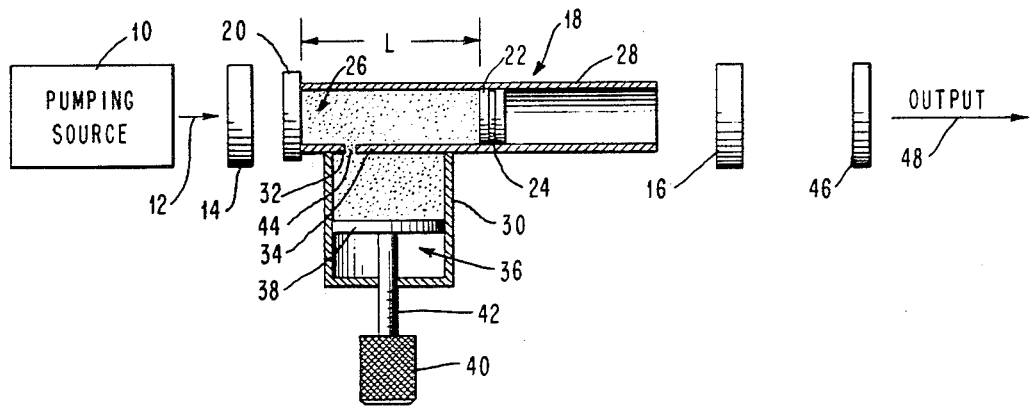
FIGURE 1 is an illustration of the preferred embodiment of the inventive continuously tunable laser.

FIGURE 1 shows a preferred embodiment of a continuously tunable organic laser. A pumping source 10, such as a laser, is generally used, although in some cases to be described more fully later, a flash lamp can be used. The output of the pumping source, denoted by the arrow 12, is incident upon mirror 14, which, together with mirror 16, is a gain control means. The gain control means is not necessarily required, as there usually is sufficient gain present in the system without this means. However, the efficiency of the system increases if the gain control means is present and, by varying the transmissive and reflective properties of the mirrors 14 and 16, the bandwidth of the system can be varied. In order to have increased tunability here, the gain control mirrors 14, 16 are made quite broadband. Mirror 16 is the output mirror of the resonant cavity formed by the gain control means and is transmissive (approximately 70%) to the range of wavelengths over which the laser is tunable. Mirror 14 is very reflective (approximately 99%) to the output frequencies of the laser, while at the same time being transmissive (approximately 40%) to the frequency of the pumping radiation.

A cell 18, made of glass, metal, or plastic is located along the optic axis of the gain control mirrors 14, 16, so that its length L is along the direction of propagation of the pumping radiation denoted by arrow 12. The cell has transparent end walls 20 and 22, where end wall 20 is fixed and end wall 22 is axially movable along the length of the cell 18. These end walls are glass windows whose faces are ground flat and are parallel to each other within the normal laser rod specifications. They are also anti-reflection coated over a broad spectral region. Window 20 is an input window through which the pumping radiation enters the cell 18, while window 22 is an output window through which the laser output, and any remaining pump radiation, leave cell 18. Output window 22 is capable of axial movement along the length of cell 18 in either direction, as movement of this window in a direction toward the pumping source 10 is achieved by a vacuum created between the interface of the laser medium 26 and window 22. This will be explained more fully below.

In order to insure a good seal between window 22 and the cell 18, an O-ring 24 is provided about window 22.

Greater simplicity of operation and increased efficiency could be achieved by substituting windows 20 and 22 with mirrors 14 and 16, although this is not required.

The cell 18 contains an active laser medium 26, which is a material having a Franck-Condon wave-length shift between its absorption and emission spectrum. Generally, an organic solution such as a dye, utilized as the laser medium. Representative solutions and other characteristics are set forth later in the specification. The portion of the laser medium 26 contained in the section 28 of the cell having length L is that which causes the absorption of the pump radiation. Cell 18 also has a transverse section 30, which is separated from section 28 by the walls 32 and 34. Contained within section 30 of cell 18 is a tuning means generally designated 36. In the preferred embodiment the tuning means is a piston 38 which is movable within section 30 of the cell. The tuning means varies the optical path of pumping radiation within the lasing medium 26. Therefore, the tuning means can be considered to include the movable end wall 22, as the coaction of piston 38 (driving portion) and end wall 22 (driven portion) change the physical length L of cell section 28.

Movement of the piston is achieved by tuning the micrometer head 40. Provided on the piston 38 is a scale 42 which is calibrated to indicate distance. Movement of the piston 38 changes the amount of laser medium in section 28 of the cell and consequently moves the slideable output window 22 along the length L. If more laser material is forced through opening 44 into the optically activated section 28 of the cell, then the output window 22 is moved to the right, increasing the length L. If piston 38 is withdrawn away from walls 32, 34, the vacuum created between output window 22 and laser medium 26 will cause laser material 26 to be withdrawn into section 30 of cell 18 and output window 22 will move to the left (toward pumping source 10), thus decreasing the length L. Hence, it is apparent that section 30 of cell 18 acts as a reservoir for the laser material 26, the tuning means 36 being used to vary the amount of laser medium in optically activated section 28 and also the physical length of this section 28. As the optical path (OP) length of a material is the product of its index of refraction and the linear distance through which the radiation travels, the length L is a measure of the optical path length of pumping radiation within the lasing medium 26 contained in section 28. Hence, by varying the physical length L, the OP length of the pump radiation within the laser medium 26 is varied. It has been found that, for a particular concentration of laser medium 26, the output frequency of the laser medium is strongly dependent on the OP length of the pumping radiation within the active laser solution. Consequently, a continuously tunable laser is provided by varying the physical length L of the cell 18.

It is to be noted that although the volume of section 28 varies as the piston 38 travels the amount of laser material 26 within this section also varies in such a way that the concentration (number of molecules per unit volume) of the laser material within this section remains substantially constant. Hence the tunability of this laser is not due to changes in concentration of the laser material as is the case in some prior art devices.

Filter 46 is provided to remove from the output radiation, denoted by arrow 48, any of the residual pumping wavelength which may still be present. It is highly reflective to the wavelength of pumping radiation while being transmissive to the wavelength of the laser medium output. This filter may be omitted if the amount of residual pumping radiation is negligible.

Thus, it is seen that a continuously tunable laser is provided having a source of pumping electromagnetic radiation, a cell containing a laser material having a Franck-Condon shift between its absorption and emission spectrum, and a tuning means for varying the optical path length of pumping radiation within the laser material. In the device shown in FIGURE 1, the optical path length is varied by changing the physical length of the cell containing the laser material. The tuning means also changes the amount of laser material in the cell in such a way that the concentration of the active laser medium remains substantially constant. In this way the tunability of the laser output can be scaled directly in terms of linear distances, and this indication is provided by the tuning means scale.

In order to understand this inventive continuously tunable laser, the theory of its operation will now be explained with reference to FIGURES 2–4. Basically, the pumping radiation is of sufficient intensity that stimulated emission occurs from the organic substance which is the active part of the laser medium. Because the dye material is one that has a Franck-Condon wavelength shift between the center frequencies of its absorption and emission spectra, the gain v. wavelength curve for the laser system will change as the absorption curve changes. The absorption curve is changed by changing the OP length of pump radiation within the laser medium, since this will change the length of organic material through which the pumping radiation travels. Since that portion of the laser medium that remains unpumped by the input pumping radiation readily absorbs any additional emission emanating from the pumped laser region (laser medium adjacent window 20), the emission curve remains essentially the same. Hence, as the OP length of the pump radiation within the laser material changes, the absorption curve changes. This causes the center wavelength of the gain curve of the system to change, and hence the output wavelength of the laser, which is the wavelength at which maximum gain occurs, also changes. Because the absorption curve changes due to changes in the physical length of the cell containing the laser material, the laser output is then a direct function of the physical length of the cell containing the laser material.

Stimulated emission within the organic laser medium is explained with reference to FIGURE 3, which is an energy level diagram for a representative dye laser material having a Franck-Condon shift. Potential energy is plotted vertically, while the abscissa represents a generalized configurational coordinate. The voltage levels $v''$ denote vibrational-rotational bands in the ground electronic state while the voltage levels $v'$ denote vibrational rotational bands in the first excited (singlet) electronic state. The energy corresponding to the positions of the sidebands and maximum absorption and emission peaks determines the position of the vibrational-rotational bands in both the ground and the excited electronic state. Due to the fact that the Franck-Condon shift is present, the first (singlet) excited electronic state is shifted with respect to the ground electronic state. Consequently, an arrow ($\nu$ pump) denoting the maximum of the (0, 0) absorption band is shifted away from the arrow ($\nu$ output) denoting the maximum of the (0, 0) emission band.

Here, the wavelength of the pump radiation output appears to coincide with the maximum of the dye vibronic absorption band ($v''=0$ to $v'=1$), and it also overlaps the tail of the (0, 0) absorption band. Due to rapid non-radiative transitions in the excited electronic state, the end-effect of the pump radiation beam is to populate the vibrational-rotational band ($v'=0$). At low dye concentrations, stimulated emission in this particular dye (used as an example in FIG. 3) occurs near the maximum of the (0, 0) emission band, which is shifted away from the maximum of the (0, 0) absorption band by virtue of the Franck-Condon principle. Because of this shift, the effect of self-absorption on the lasing action is minimized. Generally, for most molecules, the ($v'=0$, $v'=1$) spacing differs from the ($v''=0$, $v''=1$) spacing when there is a sizeable Franck-Condon shift. Hence, it is seen that radiation-pumped stimulated emission may be achieved in the strongly allowed singlet-singlet transitions of organic molecules, such as dyes.

Figure 2:
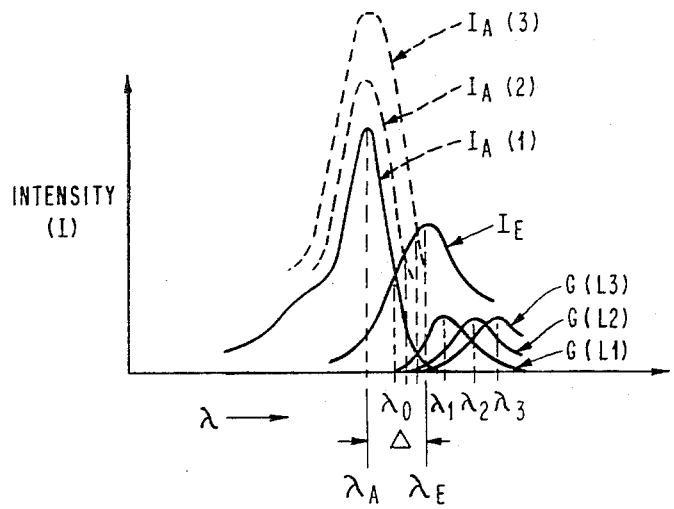
FIGURE 2 is a graphical representation of absorption, emission, and gain curves for a representative laser medium having a Franck-Condon wavelength shift.
Figure 3:
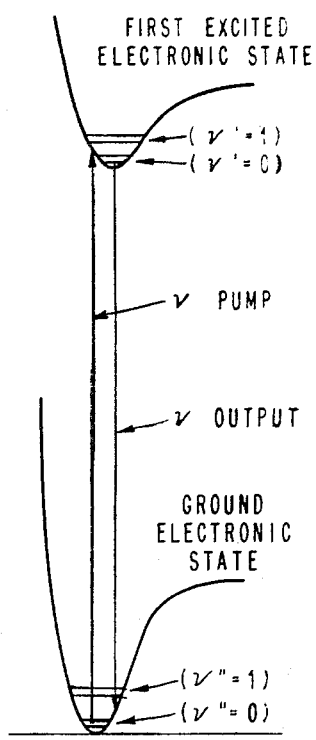
FIGURE 3 is an energy level diagram for a representative laser medium showing pumping and lasing transitions.

FIGURE 2 is a graphical representation of the absorption, emission, and gain curves for a representation laser medium having a Franck-Condon shift. Here, intensity (I) is plotted vertically, while the abscissa is the wavelength λ. The absorption curves for the lasing medium are designated $I_A(1)$, $I_A(2)$, and $I_A(3)$, while the emission curve is designated $I_E$. Even though the absorption curves change, the emission curve remains essentially the same since, as mentioned previously, any additional emission due to changes in path length is readily absorbed by the unpumped dye medium. Gain curves for the laser medium are represented by curves labelled G(L1), G(L2), G(L3). The center wavelength of the absorption curves is designated $\lambda_A$, while the center wavelength of the emission curve is designated $\lambda_E$. The difference between these wavelengths is the Franck-Condon wavelength shift, designated Δ.

The absorption curves are changed by changing the length L of the cell 18 (FIGURE 1). As the optical path length of the pump radiation in the laser medium (proportional to L) increases, the absorption maximum increases. Hence, curve $I_A(1)$ corresponds to absorption in a cell of length L1, $I_A(2)$ corresponds to absorption in a cell of length L2, and $I_A(3)$ corresponds to absorption in a cell of length L3, where L3>L2>L1. Specifically, the curves are given by the following:

$$I_E = I_0 e^{g(z)L}$$
$$I_A = I_0 e^{-\alpha(z)L}$$
$$I_{net} = I_E - I_A = I_0 e^{[g(z)-\alpha(z)]L}$$
$$I_{net} = I_0 e^{g(net)L}$$

where L is the length of the laser medium in the direction of propagation of the pump radiation, z is the instantaneous distance along the cell length as measured from the input window, and $g(z)$ and $\alpha(z)$ are functions of the lasing material.

At length L1, absorption curve $I_A(1)$ intersects emission curve $I_E$ at the wavelength $\lambda_0$. At this wavelength the absorption equals the emission and the gain curve G(L1) for length L1 is zero at $\lambda_0$. As the wavelength increases beyond $\lambda_0$, the emission becomes greater than the absorption (at L1) and G(L1) peaks at $\lambda_1$, after which it decreases in value following generally the decrease in $I_E$. Hence, for length equal to L1, the output wavelength will be centered on the wavelength $\lambda_1$, the wavelength of maximum gain.

If now the tuning means is adjusted so that the physical length of the cell is changed to L2, a new absorption curve $I_A(2)$ will result. At the intersection of absorption curve $I_A(2)$ and emission curve $I_E$, the gain G(L2) will be zero, as absorption will equal emission at that wavelength. At wavelength greater than that at which G(L2)=0, the gain increases until it peaks at $\lambda_2$, after which it decreases, following the curve $I_E$. Hence, for a cell length equal to L2, the output wavelength of the laser medium will be at the wavelength of maximum gain, i.e., at $\lambda_2$. In other words, there has been a shift in output wavelength toward longer wavelengths as the optical path length (which is directly proportional to cell length L) increases.

As in the above discussion, if now the length of the cell is changed to L3, the gain curve G(L3) for this length would have a maximum at $\lambda_3$, which is a longer wavelength than $\lambda_2$. This represents a further shift toward longer wavelengths with increasing optical path length of pump radiation within the laser medium. It is to be recognized that, for decreasing optical path lengths (smaller cell length L) the reverse effect occurs and the output wavelength of the stimulated emission from the laser medium shifts toward shorter wavelengths.

Figure 4:
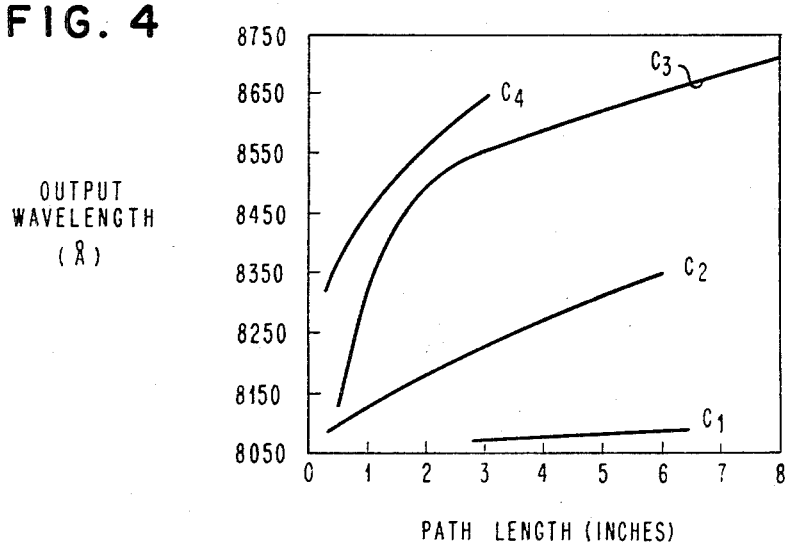
FIGURE 4 is a graphical illustration of tuning curves for a representative laser medium, showing the output wavelength as a function of optical path length of pumping radiation in the laser medium.

Referring to FIGURE 4, the continuous nature of the tuning available from this laser is shown. Here, various tuning curves are plotted for a particular dye solution (DTTC Iodine in DMSO) at various concentrations C1, C2, C3, and C4. Here $C1 = 1 \times 10^{-6}$ M, $C2 = 1 \times 10^{-5}$ M, $C3 = 1 \times 10^{-4}$ M and $C4 = 2 \times 10^{-4}$ M. It can be seen that the tuning capability of this laser varies in a continuous manner according to the optical path length of the pumping radiation within the laser material. In this particular example, the pumping source is a Q-switched ruby laser having an output wavelength 6943 A., mirror 14 is 40% transmissive at this wavelength and +99% reflective at $0.7\mu$ to $1.2\mu$, and mirror 16 is approximately 70% transmissive to wavelengths of $0.7\mu$ to $1.2\mu$. Hence, there is a tunability of over 600 A. for the $10^{-4}$ molar solution, with a strong dependency on the concentration of the dye. Also, as mentioned previously, a greater simplicity of operation and increased efficiency could be achieved by substituting the input and output windows 20, 22 with mirrors 14, 16.

At this point, it is desirable to discuss the nature of the pumping source 10. Although in most cases a laser is used as the pumping source, it is also possible to excite the dye laser by use of a flashlamp. As discussed above, laser-pumped stimulated emission may be achieved in the strongly allowed singlet-singlet transitions of organic dye molecules. However, the coherence possessed by a laser beam is really not essential for excitation. What is important for adequate pumping is (1) high peak intensity and (2) short rise time.

The need for high peak intensity is more obvious than the need for short rise time. In order to compute the required input pump power to sustain sufficient population inversion, the Townes-Schawlow formula for the required inversion density at threshold is used:

$$n_i = 8\pi^2 \tau \Delta\nu (1-R) n_r^2 / (\lambda_s^2 L \phi)$$

where:

L = active-region length
$\phi$ = fluorescent quantum efficiency
$\Delta\nu$ = half width of the (assumed single) fluorescence band
$\tau$ = observed lifetime of the fluorescence
$n_r$ = index of refraction
R = reflectivity of the end mirrors
$\lambda_s$ = wavelength center of stimulated emission For the DTTC diode laser solution, and L=10 cm., $\phi=0.1$. R=0.95, $\tau=5$ nsec., $\lambda_s = 0.8 \times 10^{-4}$, $$\Delta\nu = 400 \times 3 \times 10^{10} \text{ Hz.}$$

$n_i$ calculates out to be approximately $10^{14}$ molecules/cm.$^3$. The minimum pumping power per unit volume required to maintain this inversion is $p = n_i h \nu_s / \tau$ or about 5 kw./cm.$^3$. For a 1 cm.$^2$ cross section and a resonator 10 cms. long, the total required pumping power is P=50 kw. This gives an indication of the magnitude of required pump power for this particular dye laser medium, in a cell having the assumed dimensions.

The necessity for short rise-time pump pulses arises because a certain number of molecules will accumulate in the lowest triplet state, a metastable level, as a result of non-radiative decay from the lowest excited singlet state. This accumulation will occur during the time required for the pumping flux to reach its peak. Generally, transitions are strongly allowed from the lowest triplet state to the higher triplet states and these may occur in the same spectral region occupied by the singlet-singlet fluorescence peak. Thus, the triplet state population density accumulated by the time the first excited singlet state population density reaches $n_i$ (required inversion density at threshold) may produce an over-all loss, so that no laser action is possible. It can be calculated that the rise time of the pump pulse should not exceed a few tenths of a microsecond, in order to avoid the necessity of a pumping flux much higher than the minimum theoretically required.

In view of the above remarks, it is apparent that a flashlamp could be used as the source of pumping radiation, if the flashlamp were capable of producing pulses having a power of approximately 100 kw. over a band of about a few thousand cm.$^{-1}$, whose rise times are a few tenths of a microsecond. However, for most cases, a laser will be most desirable as a source of pumping radiation.

Figure 5:
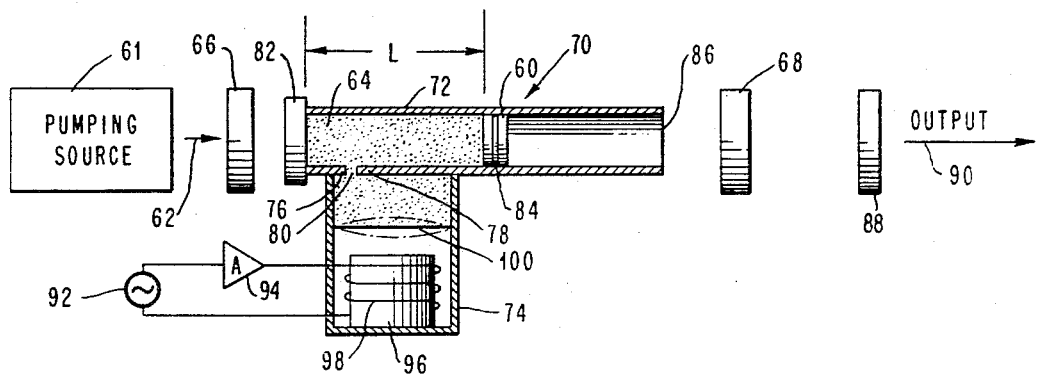
FIGURE 5 is an illustration of an embodiment for a laser whose stimulated output is frequency modulated.

FIGURE 5 shows one embodiment for a laser having an output that is frequency modulated. Here the driving portion of the tuning means causes the movable end window 60 to oscillate back and forth in accordance with the frequency of an applied signal. That is, the optical path length of pump radiation along the axis of the cell, which is equal to $nL$, where $n$ is the index of refraction of the laser medium and $L$ is the physical length of the cell, varies harmonically according to an applied signal. Consequently, the output of the tunable laser is frequency modulated according to an applied signal.

In FIGURE 5, the pumping source 61 provides input pumping radiation, denoted by arrow 62, which is of sufficient intensity and rise time to cause the necessary population inversion within the laser medium 64 so that stimulated emission will occur. Gain control means, in the form of mirrors 66 and 68 are also shown although, as mentioned with respect to FIGURE 1, these could be eliminated. The cell 70 has an optically activated section 72 through which the pump pulse passes, and a section 74 which is separated from section 72 by walls 76 and 78. A small opening 80 is provided between sections 72 and 74. The cell contains the laser medium 64 having a Franck-Condon wavelength shift. Such a medium is an organic dye contained within a suitable solvent, as in the case with the continuously tunable laser shown in FIGURE 1. The cell has a fixed input window 82, made of glass (quartz) and an axially slideable end window 60. In order to provide a seal for the end window 60, an O-ring 84 is located around the periphery of this window. Input window 82, being anti-reflective coated is transmissive to the pump radiation and the spectral range of the stimulated output. Output window 60 is also anti-reflective coated over a broad spectral range. The end 86 of section 74 of the cell 70 can be left open. Filter 88 is provided to remove any residual pumping wavelength from the stimulated output emission of the laser medium, which output is denoted by the arrow 90. As was mentioned in the discussion of the tunable laser of FIGURE 1, increased efficiency results if the windows 60 and 82 are replaced by mirrors 68 and 66.

In general, the tunable laser of FIGURE 5 is similar to that of FIGURE 1, and the considerations discussed with respect to the laser of FIGURE 1 are applicable with respect to the laser of FIGURE 5. The difference is that the tuning means shown in FIGURE 5 varies the optical path length of pump radiation within the laser medium in an oscillatory fashion, as opposed to unidirectional, steady changes. The tuning means shown in FIGURE 5 is a means for periodically varying the optical path length of pump radiation within the laser medium 64.

The tuning means is comprised of an audio oscillator 92 for providing an oscillating electrical signal of frequency $f$, an amplifier 94 for amplifying these electrical signals, an electromagnet including a core 96 having coils 98 wrapped thereon. Closely adjacent said core 96 is a magnetic diaphragm 100, whose edges are fastened to the walls of cell section 74. When a signal is applied to the coils 98 to pulse the electromagnet the diaphragm 100 is either attracted to or repulsed from the core 96, depending on the polarity of the applied signal. The oscillatory motion of the diaphragm 100 is shown in phantom by the broken lines on both sides of the diaphragm 100. This removes laser material 64 from cell section 72, or forces more laser material into cell section 72. In turn, end window 60 moves to the left due to a vacuum between window 60 and cell 70, or to the right, respectively. In this way the physical length $L$ of cell section 72 oscillates. This varies the optical path length in a reciprocating fashion, and consequently the stimulated emission from lasing medium 64, caused by the incident pump radiation 62, is frequency modulated, according to the frequency of the electrical signal from oscillator 92.

Figure 6:
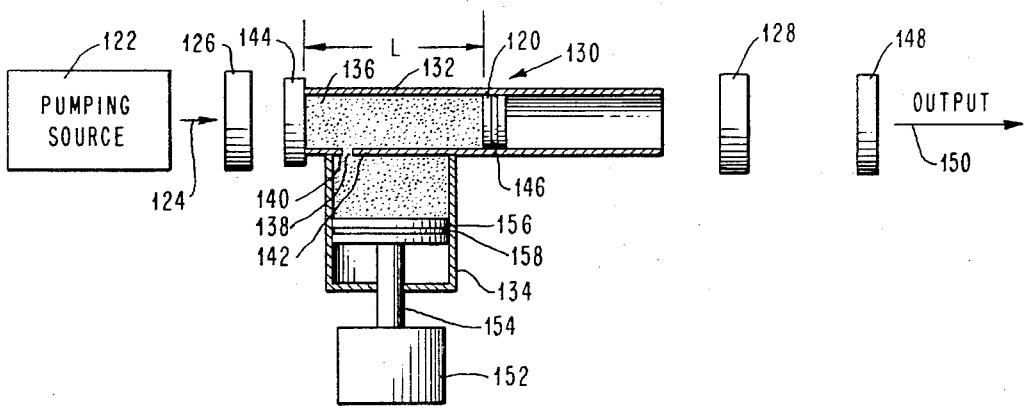
FIGURE 6 is an illustration of another embodiment for a laser whose stimulated output is frequency modulated.

Another embodiment for a laser whose output is frequency modulated is shown in FIGURE 6. This laser is essentially the same as that of FIGURE 5, with the difference being that the tuning means is a means for oscillating the optical path length of pump radiation within the laser medium at a higher frequency rate. In this embodiment, a microwave oscillator drives a quartz or piezo-electric transducer at microwave frequencies so that the end window 120 is rapidly oscillated.

Referring to FIGURE 6, pumping source 122 provides input pump pulses, represented by arrow 124. Gain control means, comprised of mirrors 126 and 128, are used here, although they are not entirely necessary as sufficient gain may exist in the system. Cell 130 has an optically activated section 132 into which pump pulses 124 are incident, and another section 134, which acts as a reservoir for additional laser material 136. The cell is located along the path of the pump radiation, i.e., its axis is along the optic axis of mirrors 126 and 128. A small opening 138 between sections 132 and 134 allows the laser material to pass into and out of these sections, which are separated by walls 140 and 142.

End windows 144 and 120 are provided. Output window 120 is axially slideable along the axis of cell section 132 and is provided with an O-ring 146 for sealing purposes. This window is antireflection coated over a broad spectral range, as is the fixed input window 144. End windows 144 and 120 are ground flat and are parallel to each other within the normal laser rod specifications. A filter 148 is provided to remove any residual pump wavelengths from the stimulated emission output, designated by arrow 150.

The tuning means in this embodiment is one which causes the physical length $L$ of the optically active cell section 132 to oscillate at microwave frequencies. In this way, the optical path length ($OP=nL$, where $n$=index of refraction of laser material 136) of pump radiation within the laser medium 136 is oscillated at microwave frequencies. Consequently, the stimulated emission from laser medium 136, caused by the input pump radiation 124, has a frequency modulated spectrum. The tuning means is a means to oscillate the optical path length at microwave frequencies and is comprised of a source 152 of microwave signals, a microwave cavity 154, and a transducer 156 such as a quartz, a piezo-electric material or CdS. The transducer 156 is mechanically displaced upon the incidence of high frequency electrical signals. The transducer 156 is surrounded by a sealing O-ring 158. Depending on the polarity of applied signals the transducer 156 is physically oscillated which causes either more or less lasing medium 136 to be in the cell section 132. This in turn slides the end window 120 to the right or left along the axis of cell section 132 to oscillate the physical length $L$. Oscillation of length $L$ causes the optical path length of pump radiation within the lasing medium 136 to be oscillated. Consequently, the stimulated emission from laser medium 136, caused by the pumping radiation 124, has a spectrum which is frequency modulated at microwave frequencies.

The following table is presented to show some representative organic materials which may be used as the laser medium. In all cases the tunable laser is that shown in FIGURE 1. It is to be understood however, that the following table is to be by no means limiting, as any laser medium which exhibits a Franck-Condon wavelength shift between its absorption and emission curves could be used.

| Wavelength Range | Pumping Source | Representative Laser Medium |
| --- | --- | --- |
| 3,500–7,000A | 2nd harmonic Q-spoiled ruby laser | Acridone in ethyl alcohol 9, 10-diphenylanthracene 4-methylumbelli-terone. |
| | 2nd harmonic Q-spoiled $Nd^{3+}$ in glass laser | Fluorescein in ethyl alcohol or $H_2O$. |
| | $N_2$ gas laser at 3,371A | Acridine red in ethyl alcohol. |
| 7,100–10,000A | Q-spoiled ruby laser | DTTC iodine in DMSO. |
| >1.0$\mu$ | Q-spoiled $Nd^{3+}$ laser | Carbocyanine type dyes. |

It is to be further recognized that, although an end pumping scheme is illustrated throughout, a transverse pumping scheme could be employed. It is only important that the optical path length of the pump pulses within the laser medium be varied in order to achieve a tuning capability.

Hence, a continuously tunable laser has been described whose output frequency is a direct function of the optical path length of the pump radiation within the laser medium. The laser medium is one which has a Franck-Condon shift between its absorption and emission spectrum, and is usually an organic material, such as a dye dissolved in a suitable solvent. If desired, a frequency modulated laser output can be obtained by oscillation of the said optical path length. This tunable laser has numerous advantages, chief of which are its wide range of tuning capability, its simplicity of operation, and lack of complex, sophisticated hardware.

While the invention has been particularly shown and described with reference to preferred embodiments thereof, it will be understood by those skilled in the art that various changes in form and details may be made therein without departing from the spirit and scope of the invention.

What is claimed is:

1. A laser having a continuously tunable output frequency, comprised of:
    a pumping source of electromagnetic radiation;
    a cell containing a laser medium having a Franck-Condon wavelength shift between its absorption and emission spectrum, said electromagnetic radiation being incident into said laser medium and of sufficient energy to cause stimulated emission from said laser medium;
    tuning means for controlling the frequency of said stimulated emission, said tuning means varying the optical path length of said electromagnetic radiation within said laser medium.

2. The continuously tunable laser of claim 1, in which said tuning means for varying the optical path length of said electromagnetic radiation within said laser medium controls the linear length of said laser medium through which said electromagnetic radiation travels.

3. The continuously tunable laser of claim 1, further including gain control means for increasing the amount of energy transfer from said electromagnetic radiation to said laser medium, said gain control means being comprised of mirrors which enclose said cell within a resonant cavity.

4. The continuously tunable laser of claim 3, in which said gain control mirrors form the end walls of said cell.

5. The continuously tunable laser of claim 1, in which said tuning means includes a driving means for varying the amount of laser medium within said cell and means responsive to said driving means for varying the physical length of said cell in a direction along the direction of travel of said electromagnetic radiation within said cell.

6. The continuously tunable laser of claim 5, in which said driving means is a piston and said means responsive to said driving means is a movable end wall of said cell, the travel of said piston in one direction forcing more laser medium into said cell and forcing said movable end wall to move in a first direction within said cell, the travel of said piston in the opposite direction withdrawing laser material from said cell to move said movable end wall in a second direction, this movement of said end wall being due to a vacuum that exists between said movable end wall and said cell.

7. The continuously tunable laser of claim 1, in which said laser medium is an organic solution having a Franck-Condon shift between its absorption and emission spectrum.

8. A laser having a continuously tunable output frequency, comprised of:
    a pumping source of electromagnetic radiation;
    a cell containing a laser medium having a Franck-Condon wavelength shift between its absorption and emission spectrum, said electromagnetic radiation being incident into said laser medium and of sufficient energy to cause stimulated emission from said laser medium;
    tuning means for controlling the frequency of said stimulated emission, said tuning means varying the optical path length of said electromagnetic radiation within said laser medium by varying the linear length of said laser medium through which said electromagnetic radiation travels, said tuning means maintaining approximately constant the concentration of said laser medium within said cell.

9. The continuously tunable laser of claim 8, where said cell is located within a gain control means for increasing the amount of energy transfer from said electromagnetic radiation to said laser medium, said gain control means being comprised of mirrors which form a resonant cavity.

10. The continuously tunable laser of claim 8, where said cell has a movable end wall, slidable along the length of said cell, and said tuning means is adjustable to move said end wall to increase or decrease the length of said cell.

11. The continuously tunable laser of claim 10, where said tuning means includes means for controlling the amount of laser medium within said cell, the movement of said movable end wall being responsive to the increase or decrease of said laser material in said cell.

12. The continuously tunable laser of claim 8, where said laser medium is an organic solution having a Franck-Condon wavelength shift between its emission and absorption spectrum.

13. A laser having a continuously tunable output frequency, comprised of:
    a pumping source of electromagnetic radiation;
    a cell containing a laser medium having a Franck-Condon wavelength shift between its absorption and emission spectrum, said electromagnetic radiation being incident into said laser medium and of sufficient energy to cause stimulated emission from said laser medium;
    tuning means for varying the output frequency of said stimulated emission by varying the optical path length of electromagnetic radiation within said laser medium, said tuning means controlling the physical length of said laser medium through which the incident electromagnetic radiation passes, said tuning means including:

driving means for controlling the amount of laser medium in said cell, and means responsive to said driving means, said responsive means being a movable end wall of said cell, said movable end wall being slidable along said cell, the movement of said end wall varying the physical length of the cell through which said incident electromagnetic radiation travels;

gain control means for increasing the amount of energy transfer from said electromagnetic radiation to said laser medium, said gain control being a resonant cavity formed by mirrors which enclose said cell.

14. The continuously tunable laser of claim 13, in which said gain control mirrors are the end walls of said cell, one of which is slidable along the length of said cell, the movement of said slidable end wall being in response to the amount of laser medium entered into or withdrawn from said cell by said driving means.

15. A continuously tunable laser, whose output is frequency modulated, comprising:

a pumping source of electromagnetic radiation;

a cell containing a laser medium having a Franck-Condon wavelength shift between its absorption and emission spectrum, said electromagnetic radiation being incident into said laser medium and of sufficient energy to cause stimulated emission from said laser medium;

tuning means for controlling the frequency of said stimulated emission, said tuning means periodically varying the optical path length of said electromagnetic radiation within said laser medium.

16. The continuously tunable laser of claim 15, in which said tuning means periodically varies the physical length of said laser medium through which said electromagnetic radiation travels.

17. The continuously tunable laser of claim 16, in which said tuning means is comprised of driving means for periodically varying the amount of laser medium within said cell, and means responsive to said driving means for periodically varying the physical length of said cell through which said electromagnetic radiation travels in accordance with the amount of laser medium in said cell.

18. The continuously tunable laser of claim 17, in which said driving means is comprised of an oscillating diaphragm and said means responsive to said driving means is a movable end wall of said cell, said movable end wall being slidable along the length of said cell in accordance with the movement of said diaphragm.

19. The continuously tunable laser of claim 17, in which said driving means is a piezoelectric transducer that is periodically displaced according to an incident electromagnetic signal, and said means responsive to said driving means is a movable end wall of said cell, said movable end wall being slidable along the length of said cell, the movement of said movable end wall being controlled by the periodic displacement of said transducer.

20. The continuously tunable laser of claim 15, including gain control means for increasing the amount of energy transferred from said pumping electromagnetic radiation to said laser medium, said gain control means being comprised of mirrors which form a resonant cavity in which said cell is located.

21. The continuously tunable laser of claim 20, where said gain control means is the end walls of said cell, one of said end walls being slidable along the length of said cell to vary the optical path length of said pumping electromagnetic radiation within said cell.

22. A tunable laser whose output is frequency modulated, comprising:

a source of pumping electromagnetic radiation;

a cell containing a laser medium having a Franck-Condon wavelength shift between its absorption and emission spectrum, said electromagnetic radiation being incident into said laser medium and of sufficient energy to cause stimulated emission from said laser medium;

tuning means for controlling the frequency of said stimulated emission, said tuning means periodically varying the optical path length of said pumping electromagnetic radiation within said laser medium, said tuning means including:

driving means for periodically changing the amount of laser medium in said cell;

means responsive to said driving means for periodically varying the physical length of said cell through which said pumping electromagnetic radiation travels, said means responsive to said driving means being a movable end wall which is slidable along the length of said cell;

gain control means for increasing the amount of energy transferred from said incident electromagnetic radiation to said laser medium, said gain control means being comprised of mirrors which form a resonant cavity in which said cell is located.

23. The continuously tunable laser of claim 22, in which said gain control means are the end walls of said cell, one of said end walls being slidable along the length of said cell, the movement of said slidable end wall being in response to the driving means.

No references cited.

RODNEY D. BENNETT, Primary Examiner

CHARLES E. WARDS, Assistant Examiner

U.S. Cl. X.R.

331—94.5